UNITED STATES PATENT OFFICE.

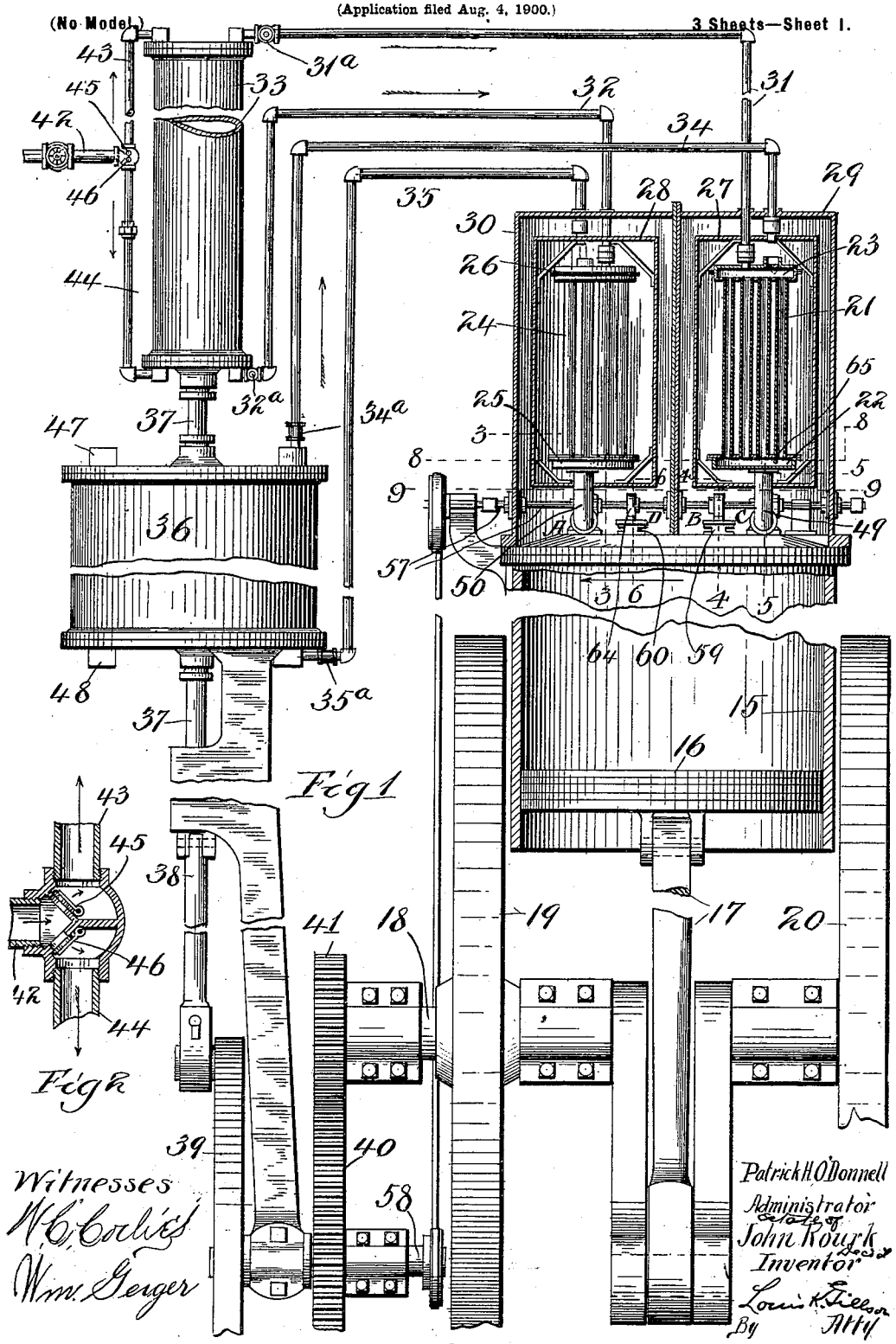

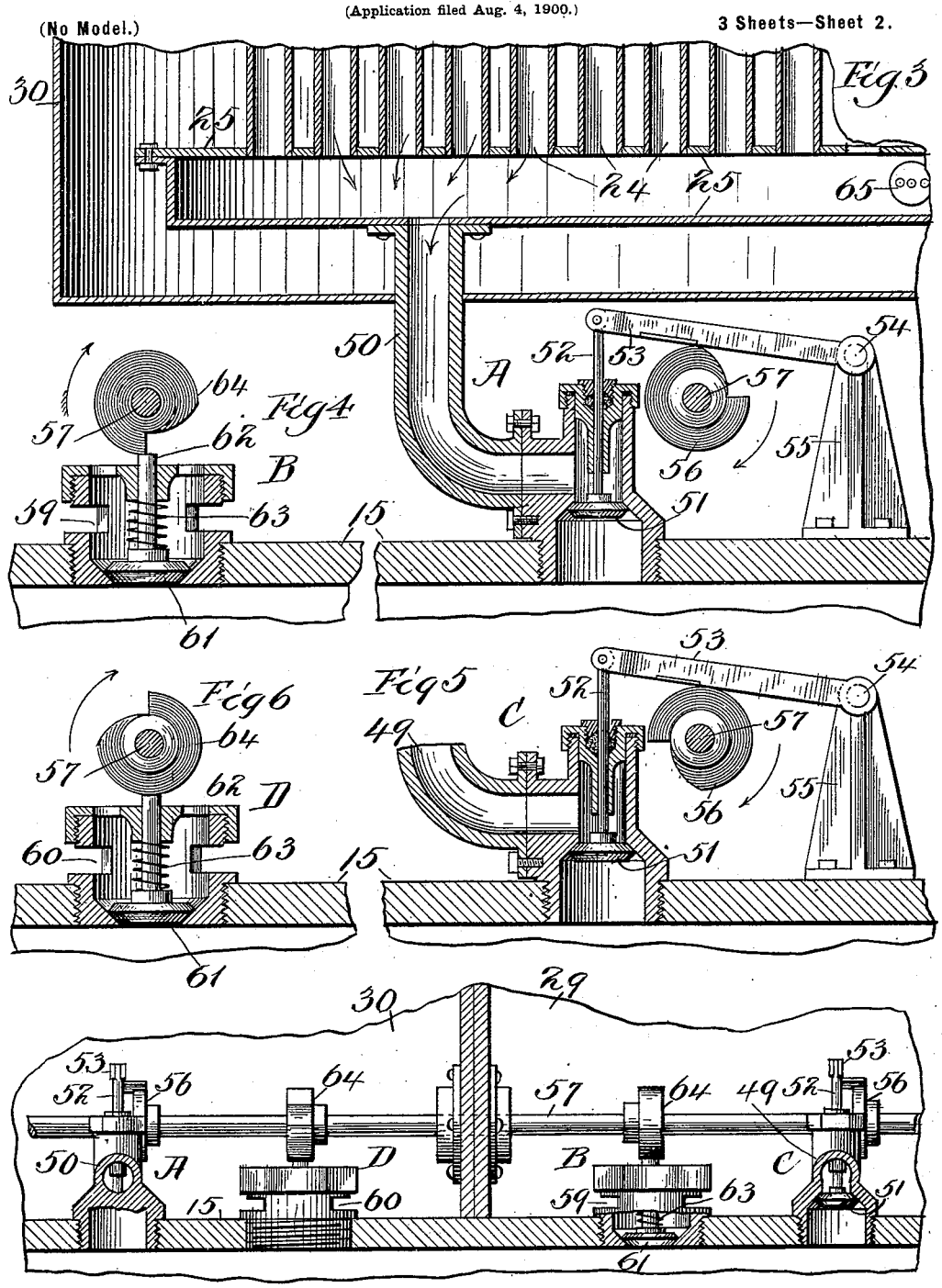

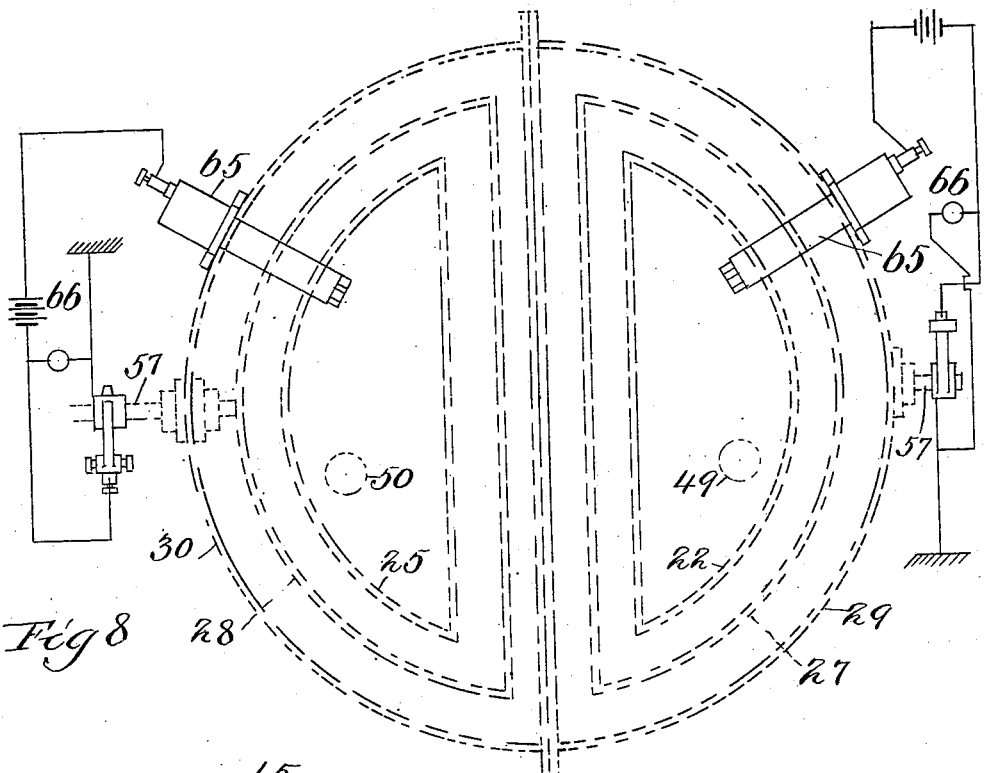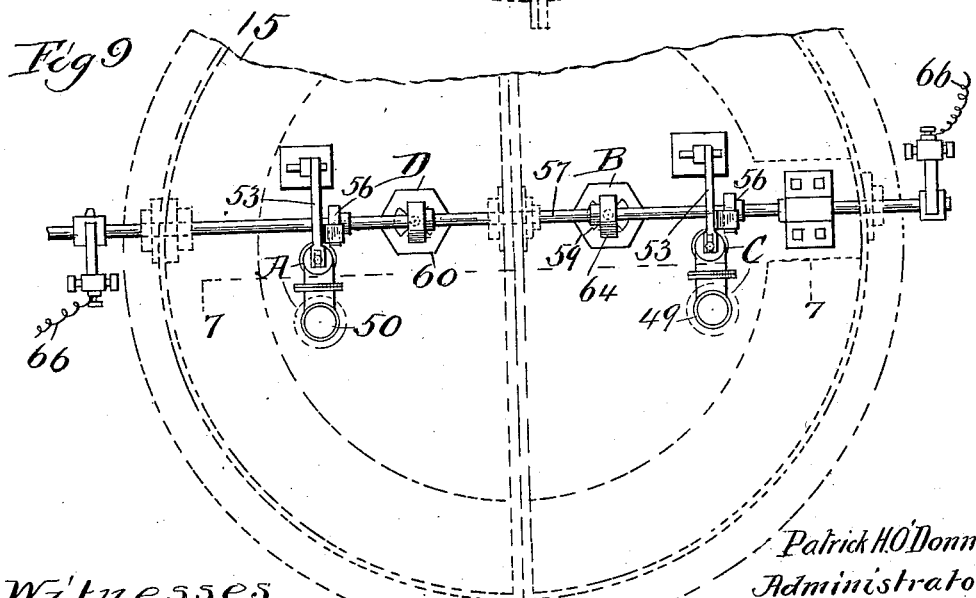

PATRICK H. O'DONNELL, OF CHICAGO, ILLINOIS, ADMINISTRATOR OF JOHN ROURK, DECEASED.

GAS-ENGINE.

SPECIFICATION forming part of Letters Patent No. 674,709, dated May 21, 1901.

Application filed August 4, 1900. Serial No. 25,896. (No model.)

*To all whom it may concern:*

Be it known that I, PATRICK H. O'DONNELL, a citizen of the United States, and a resident of Chicago, county of Cook, and State of Illinois, am the administrator of the estate of JOHN ROURK, deceased, late a resident of Chicago, county of Cook, and State of Illinois, who invented certain new and useful Improvements in Gas-Engines, of which invention the following is a specification, and which is illustrated in the accompanying drawings, forming a part thereof.

This invention relates to engines in which power is developed by the combustion of gases, its object being to generally improve engines of this class and to increase their efficiency.

The invention consists in the mechanism hereinafter fully described, and which is illustrated in the accompanying drawings, in which—

Figure 1 is a plan view, partly in section and partly in elevation, of a reciprocating engine into which the invention is incorporated. Fig. 2 is a detail of certain parts of a pump used in connection with the engine. Figs. 3, 4, 5, and 6 are sectional details on the lines 3 3, 4 4, 5 5, and 6 6 of Fig. 1. Fig. 7 is a sectional detail on the line 7 7 of Fig. 9. Figs. 8 and 9 are details in elevation of certain parts viewed from the lines 8 8 and 9 9, respectively, of Fig. 1, outlines of other parts of the engine being indicated by dotted lines.

The principle of action of the improved engine is as follows: A combustible charge under pressure is ignited in a combustion-chamber or radiator, which is inclosed within a chest filled with compressed air, the radiator having a valve-controlled passage leading to the cylinder of the engine and an induction-port closed by an inwardly-opening check-valve communicating with the inclosing air-chest. The combustible charge having been ignited, the passage leading from the combustion-chamber to the power-cylinder is opened, and the gases due to the combustion escape thereinto, and thus apply initial pressure to the piston. Much of the heat developed by the combustion escapes through the walls of the radiator and raises the temperature of the compressed air in the inclosing chest, thus augmenting the pressure therein. As soon as the pressure of air within the chest exceeds the pressure within the radiator, due to the increasing pressure within the chest and the decreasing pressure within the radiator, owing to the escape of the gases into the power-cylinder and the loss of their heat to the air, the induction-port leading from the air-chest to the combustion-chamber opens by the yielding of the check-valve, and the compressed air, which greatly exceeds in volume the capacity of the combustion-chamber, rushes through the latter into the power-cylinder and expanding therein forces out the piston. Preferably two such radiators and air-chests are used, and each is inclosed within an exhaust-shell, into which the exhaust from the power-cylinder is discharged upon the return stroke of the piston. The power is developed alternately in the two radiators, and the exhaust is through the shell inclosing the radiator which is next to be brought into service, so that the air within the chest inclosing such radiator is partially heated, or at least is kept from cooling by being enveloped in the comparatively hot gases of the exhaust. This apparatus, together with the necessary pumps for providing the fuel and compressed air, may be applied to many, indeed to most, types of gas-engines now in use. They are shown in the drawings and are hereinafter described as applied to a single-acting reciprocating engine, though by reason of the comparatively low temperature at which the gases and air are applied to the piston it would be entirely feasible to so construct the engine that power might be applied to both sides of the piston.

In the drawings there is shown a power-cylinder 15, within which reciprocates a piston 16, connected, by means of a pitman 17, to the crank of a shaft 18, upon which there are mounted balance-wheels 19 and 20.

The radiator is preferably, though not necessarily, of tubular form and is shown as comprising a plurality of tubes 21, having their ends set in the cases 22 and 23 in the one instance and in the case of the other radiator comprising the pipes 24, set in the cases or headers 25 26. Each of the radiators is inclosed within a strong sheet-metal chest 27 28 of considerably greater capacity than the radiator itself, and each of these chests is inclosed within an outer shell 29 30, secured to the head of the cylinder 15. The radiators are supplied with fuel through the pipes 31 32, leading, respectively, from opposite ends of the cylinder 33 of a pump. The compressed air is led to the chests 27 28, respectively, through the pipes 34 35, leading from the opposite ends of the cylinder 36 of an air-pump. The fuel and air pumps are of the reciprocating type and are arranged tandem, so that their pistons may be driven by a single rod 37, which is connected by a pitman 38 to a crank 39, mounted upon a suitable shaft, which also carries a gear-wheel 40, intermeshing with and driven by a pinion 41, mounted upon the power-shaft 18. A pipe 42 leads from any suitable fuel-reservoir to the distributing-pipes 43 44, entering, respectively, the opposite ends of the cylinder 33. Check-valves 45 46 are located in each of the distributing-pipes, so as to close at the return stroke of the piston, opening freely to suction occasioned thereby. Each of the pipes 31 32 is provided with a check-valve 31ᵃ 32ᵃ, which opens to pressure within the cylinder 33, but closes against the return of the gases through the pipes 31 32. The cylinder 36 is provided at its opposite ends with inlet-valves 47 48, which open to suction in the usual manner of air-pumps, and the pipes 34 and 35 are also provided with check-valves 34ᵃ and 35ᵃ, which prevent the return of air therethrough.

The combustion-chambers communicate with the interior of the cylinder 15 through commodious pipes 49 and 50. As these two pipes and the valve mechanisms are alike, though the latter is timed differently, but one need to be described in detail.

A puppet-valve 51 is used and is seated so as to open inwardly as to the cylinder. The stem 52 of the valve projects through a suitable stuffing-box and is loosely jointed to a lever 53, pivoted at 54 to a fixed bracket 55 and riding upon the periphery of a snail-cam 56, fixed upon a shaft 57, actuated from the shaft 58, which carries the gear-wheel 40. The cam 56 is so formed that the lever 53 may fall from its step when the piston 16 is at the inner end of its stroke. The pressure developed at this instant within the combustion-chamber forces the valve 51 from its seat and the latter is not restored thereto until the piston 16 reaches the end of its outstroke. The valve 51 plays within a sufficiently-commodious chamber, so that ample space is provided for the passage by it of fluid to the full capacity of the pipe 50 until the valve practically reaches its seat, so that the cam 56 may be formed with a gradual rise for bringing the valve to its seat, the maximum of the swell of the cam being reached as the piston reaches the end of the stroke.

Two exhaust-ports 59 and 60 are provided, the one opening into the compartment 29 and the other into the compartment 30 of the exhaust-shell. The valve mechanism for controlling these two ports being identical, except as to timing of action, but one need be described. Each exhaust-port is closed by a puppet-valve opening outwardly from the chamber of the cylinder 15, such valve being shown at 61 and having a suitable guide-stem 62 and being normally held to its seat by a spring 63. The upper end of the stem 62 bears against the periphery of a snail-cam 64, mounted upon the shaft 57 and so timed that its step releases the stem 62 from downward pressure when the piston 16 is at the outer end of its stroke, thereby allowing the valve to rise in opposition to the spring 63 and in response to the pressure within the cylinder. The periphery of the cam 64 reaches its maximum radius after a gradual swell when the piston has reached the end of its instroke, thereby forcing the valve 61 to its seat. This valve plays in a sufficiently-commodious chamber, so that ample passage is allowed for the exit of the fluid contents of the cylinder until the valve is practically seated.

The snail-cams for controlling the two induction-ports and the two exhaust-ports of the cylinder are all mounted upon the same shaft 57 and are timed to open the valves they severally control in succession. The gear 40 being double the size of the pinion 41, by which it is driven, the shaft 57 rotates with one-half the speed of the power-shaft 18, so that each of the induction and exhaust valves is actuated once in two revolutions of the power-shaft. The several snail-cams are therefore set at intervals of ninety degrees apart. For convenience the several valves are lettered A B C D in the order in which they are actuated. Assuming the piston 16 to be at the end of its instroke and the cam 56 for controlling the valve A having reached a position so that the lever 53 has just dropped from its step, the explosion having occurred within the corresponding combustion-chamber, power is applied through the port at A to drive the engine-piston outwardly, the other three valves remaining closed. When the piston has reached the end of its outstroke, the valve at A is closed and the exhaust-valve at B opens and remains open during the next instroke of the piston 16, closing at the end of such stroke. During this out-and-in movement of the piston 16 the piston-rod 37 has been moving in the direction of the top of the sheet in Fig. 1, thereby filling the air-chest 27 and the radiator inclosed within it. At the end of the instroke of the piston 16 the exhaust-valve at B reaches its seat and the valve at C is unseated, an explosion occurring within the combustion-chamber, with which it coöperates. The pressure is now applied to drive the piston 16 outwardly through the valve at C, which closes at the end of the outstroke of the piston, the exhaust-valve at D opening at the same instant and remaining open until the end of the following instroke of the piston. This completes the cycle of the engine; but it will be seen that two explosions have occurred, so that power is applied at each outstroke of the piston. The volume of air inclosed within the chests 27 and 28 so greatly exceeds the capacity of the radiators that in its passage therethrough it sweeps out all of the burned gases, thoroughly cleansing the combustion-chamber in readiness for the succeeding charge. The heat developed by the explosions is communicated to a volume of air so large that a temperature is not attained within the power-cylinder which is inimical to the proper operation of the engine, and hence it is entirely unnecessary to make use of a water-jacket or other means for absorbing and carrying away heat in excess of that which can be utilized and transformed into power. Not only, therefore, is the great inconvenience of a water-jacket or other cooling agent avoided, but the energy which has heretofore necessarily been lost through such agency and which amounts to a very large part of all of the power developed is utilized.

Any suitable igniting device may be employed. A suitable location for the sparking-electrodes of an electric igniter is indicated at 65, one for each of the combustion-chambers, and an electric circuit, together with circuit-breaking mechanism, is conventionally shown at 66.

The details of the invention may be worked out in a variety of ways. The invention broadly consists in means for developing power exteriorly to the power-cylinder and communicating a considerable part of the energy to the body of compressed air which is employed to cleanse the combustion-chamber and to drive the piston of the engine.

I claim as the invention of the said JOHN ROURK, deceased—

1. In a gas-engine, in combination, a power-cylinder, an explosion-chamber exterior to but connected with the power-cylinder, an air-chamber inclosing the explosion-chamber, a valve for automatically opening communication from the air-chamber to the explosion-chamber, and means for causing intermittent combustion in the explosion-chamber.

2. In a gas-engine, in combination, a power-cylinder, an explosion-chamber exterior to but connected with the power-cylinder, an air-chamber inclosing the explosion-chamber, a valve for automatically opening communication from the air-chamber to the explosion-chamber, means for forcing the explosive charge into the explosion-chamber, means for forcing air into the air-chamber, and means for intermittently firing the explosive charge within the explosion-chamber.

3. In a gas-engine, in combination, a power-cylinder, an explosion-chamber exterior to but connected with the power-cylinder, an air-chamber inclosing the explosion-chamber, a valve for automatically opening communication from the air-chamber to the explosion-chamber, a casing inclosing the air-chamber, an exhaust-port opening from the power-cylinder into said last-named casing, a valve for controlling such port, and a valve for the connection between the explosion-chamber and the power-cylinder, and means for opening said valves in alternation.

4. In a gas-engine, in combination, a power-cylinder, a pair of explosion-chambers each being exterior to and connected with the power-cylinder, an air-chamber inclosing each explosion-chamber, a valve for the passage connecting each explosion-chamber with the power-cylinder, means for opening said valves in alternation, and means for intermittently firing the charge within the explosion-chamber.

PATRICK H. O'DONNELL,
*Administrator of the estate of John Rourk, deceased.*

Witnesses:
  E. M. KLATCHER,
  LOUISE M. LARSEN.